US010783499B1

(12) United States Patent
Mercado et al.

(10) Patent No.: US 10,783,499 B1
(45) Date of Patent: Sep. 22, 2020

(54) SYSTEM AND METHOD FOR OFFERING CUSTOMERS' APPOINTMENTS BASED ON THEIR PREDICTED LIKELIHOOD OF ACCEPTING THE APPOINTMENT

(71) Applicant: MH SUB I, LLC, El Segundo, CA (US)

(72) Inventors: Marjo Mercado, Los Angeles, CA (US); Joseph Rosenblum, Santa Monica, CA (US); Kevin Caywood-Casado, Pasadena, CA (US); Ming Cong, Long Beach, CA (US)

(73) Assignee: MH Sub I, LLC, El Segundo, CA (US)

( * ) Notice: Subject to any disclaimer, the term of this patent is extended or adjusted under 35 U.S.C. 154(b) by 283 days.

(21) Appl. No.: 15/802,242

(22) Filed: Nov. 2, 2017

(51) Int. Cl.
*G06Q 10/10* (2012.01)
*G06Q 10/06* (2012.01)

(52) U.S. Cl.
CPC ....... *G06Q 10/1095* (2013.01); *G06Q 10/067* (2013.01); *G06Q 10/06375* (2013.01); *G06Q 10/063118* (2013.01)

(58) Field of Classification Search
CPC .............. G06Q 10/1095; G06Q 10/109; G06Q 10/1093; G06Q 10/063116; G06Q 10/10; G06Q 10/06
See application file for complete search history.

(56) References Cited

U.S. PATENT DOCUMENTS

| | | | | |
|---|---|---|---|---|
| 6,657,643 B1* | 12/2003 | Horvitz | ................ | G06Q 10/109 715/709 |
| 7,127,412 B2* | 10/2006 | Powell | ........... | G06Q 10/063112 705/7.16 |
| 8,271,295 B1* | 9/2012 | Miller | .................. | G06Q 10/109 705/2 |
| 8,965,972 B2* | 2/2015 | Faulbacher | ............ | G06Q 10/10 709/204 |
| 9,978,043 B2* | 5/2018 | Jon | ........................ | G06F 3/0488 |
| 10,083,411 B2* | 9/2018 | Kinsey, II | .......... | G06Q 30/0627 |
| 2004/0003042 A1* | 1/2004 | Horvitz | ................ | G06Q 10/109 709/204 |
| 2004/0268210 A1* | 12/2004 | Gul | ........................ | G06Q 10/10 715/255 |

(Continued)

OTHER PUBLICATIONS

Gupta. Diwakar et al., Appointment Scheduling in health care: Challenges and opportunities IIE Transactions, vol. 40, 2008 (Year: 2008).*

(Continued)

*Primary Examiner* — Scott L Jarrett
(74) *Attorney, Agent, or Firm* — Rutan & Tucker, LLP (57) ABSTRACT

A non-transitory storage medium having stored thereon instructions, the instructions being executable by one or more processors to perform operations comprising responsive to a trigger, generating a model based on extracted features from a first selection of data from a dataset, testing the predictive appointment model based on a second selection of data from the dataset. Applying the predictive appointment model to the dataset to generate customer preference probabilities. Aggregating a list of available appointments. Predicting and proactively contacting customers most likely to accept one or more available appointments based on the customer preference probabilities.

28 Claims, 9 Drawing Sheets

(56) References Cited

U.S. PATENT DOCUMENTS

| | | | | |
|---|---|---|---|---|
| 2006/0010206 A1* | 1/2006 | Apacible | | H04M 3/436 |
| | | | | 709/205 |
| 2006/0047552 A1* | 3/2006 | Larsen | | G06Q 10/109 |
| | | | | 705/80 |
| 2006/0047554 A1* | 3/2006 | Larsen | | G06Q 10/06 |
| | | | | 705/7.24 |
| 2006/0235280 A1* | 10/2006 | Vonk | | G06F 19/3481 |
| | | | | 600/300 |
| 2007/0022075 A1* | 1/2007 | Horvitz | | G06F 8/35 |
| | | | | 706/52 |
| 2007/0203761 A1* | 8/2007 | Keen | | G06F 19/3481 |
| | | | | 705/5 |
| 2009/0049127 A1* | 2/2009 | Juan | | G06Q 10/10 |
| | | | | 709/204 |
| 2009/0112984 A1* | 4/2009 | Anglin | | G06Q 10/00 |
| | | | | 709/204 |
| 2009/0138283 A1* | 5/2009 | Brown | | G06Q 10/109 |
| | | | | 705/3 |
| 2009/0164236 A1* | 6/2009 | Gounares | | G06Q 10/00 |
| | | | | 705/2 |
| 2009/0327169 A1* | 12/2009 | Kamar | | G06Q 10/109 |
| | | | | 706/11 |
| 2010/0017222 A1* | 1/2010 | Yeluri | | G06Q 10/06 |
| | | | | 705/2 |
| 2010/0293029 A1* | 11/2010 | Olliphant | | G06Q 10/06314 |
| | | | | 705/7.19 |
| 2011/0313806 A1* | 12/2011 | Huang | | G06Q 10/109 |
| | | | | 705/7.19 |
| 2013/0132194 A1* | 5/2013 | Rajaram | | G06Q 30/0251 |
| | | | | 705/14.52 |
| 2013/0332525 A1* | 12/2013 | Liu | | G06Q 50/01 |
| | | | | 709/204 |
| 2014/0089320 A1* | 3/2014 | Baldwin | | G06Q 50/01 |
| | | | | 707/748 |
| 2014/0108333 A1* | 4/2014 | Jain | | H04L 67/22 |
| | | | | 707/609 |
| 2014/0278679 A1* | 9/2014 | Navani | | G06Q 10/06311 |
| | | | | 705/7.19 |
| 2014/0317120 A1* | 10/2014 | Ghose | | G06F 16/9535 |
| | | | | 707/738 |
| 2015/0170045 A1* | 6/2015 | Kirkham | | G06Q 10/06 |
| | | | | 706/11 |
| 2015/0242819 A1* | 8/2015 | Moses | | G06Q 10/04 |
| | | | | 705/7.19 |
| 2015/0269328 A1* | 9/2015 | Wiley | | G16H 40/20 |
| | | | | 705/2 |
| 2016/0253462 A1* | 9/2016 | Zhong | | G06Q 10/1095 |
| | | | | 705/2 |
| 2016/0328681 A1* | 11/2016 | Portnoy | | G06Q 10/1095 |
| 2017/0098197 A1* | 4/2017 | Yu | | G06Q 10/1095 |
| 2017/0308866 A1* | 10/2017 | Dotan-Cohen | | H04L 43/0876 |
| 2017/0357904 A1* | 12/2017 | Adler | | G06Q 10/109 |
| 2018/0005194 A1* | 1/2018 | Dotan-Cohen | | G06Q 10/1095 |

OTHER PUBLICATIONS

Wang, Wen-Ya et al., Adaptive Appointment Systems with Patient Preferences Manufacturing & Service Operations Management, vol. 13, No. 3, Summer 2011 (Year: 2011).*

Raschka, Sebastin, Predictive modeling, supervised machine learning, and pattern classification—the big picture Sebastianraschka.com, Oct. 5, 2014 (Year: 2014).*

Ma, Nang Laik et al., Predictive Analytics for Outpatient Appointements Singapore Management University, Apr. 2014 (Year: 2014).*

* cited by examiner

| Customer ID | Mon | Tue | Wed | Thu | Fri | Sat | AM | PM | EVE | Period 1 | Period 2 |
|---|---|---|---|---|---|---|---|---|---|---|---|
| 4374 | 0.27 | 0.17 | 0.19 | 0.31 | 0.01 | 0.06 | 0.08 | 0.35 | 0.57 | 0.43 | 0.57 |
| 4375 | 0.11 | 0.12 | 0.21 | 0.25 | 0.24 | 0.08 | 0.22 | 0.27 | 0.51 | 0.32 | 0.68 |
| 4376 | 0.21 | 0.19 | 0.15 | 0.24 | 0.21 | 0.01 | 0.28 | 0.40 | 0.32 | 0.47 | 0.53 |
| 4377 | 0.24 | 0.01 | 0.26 | 0.09 | 0.34 | 0.07 | 0.10 | 0.38 | 0.52 | 0.59 | 0.41 |
| 4378 | 0.18 | 0.18 | 0.18 | 0.13 | 0.26 | 0.07 | 0.07 | 0.41 | 0.52 | 0.30 | 0.70 |
| 4379 | 0.14 | 0.21 | 0.10 | 0.13 | 0.12 | 0.31 | 0.25 | 0.19 | 0.56 | 0.24 | 0.76 |
| 4380 | 0.21 | 0.21 | 0.15 | 0.10 | 0.12 | 0.21 | 0.03 | 0.55 | 0.42 | 0.45 | 0.55 |

SYSTEM AND METHOD FOR OFFERING CUSTOMERS' APPOINTMENTS BASED ON THEIR PREDICTED LIKELIHOOD OF ACCEPTING THE APPOINTMENT

FIELD

Embodiments of the disclosure relate to the field of an automated, appointment scheduler. More specifically, an aspect of the invention relates to a system and a method for generating a predictive appointment model and leveraging the predictive appointment model to select and contact potential customers to fill open appointment times.

GENERAL BACKGROUND

In the U.S. alone, the professional services industry comprises approximately 883,000 companies, employing 8.6 million Americans and producing a combined annual revenue of approximately 1.6 trillion dollars. In the professional services industries, the commodity being traded is access to a skilled professional for a determined length of time. Such professional services can cover a diverse range of industries including medical, law, business, architecture, engineering, automotive, financial, information technology (IT), health and beauty, or the like. The efficient scheduling of time and appointments with skilled professionals is not only critical to their success, but also has a profound influence on the economy as a whole.

Currently, the scheduling of appointments is carried out by support staff, who are responsible for scheduling appointments with these professionals, but are provided with little more than a calendar and an address book. As a result, the scheduling or rescheduling of appointments is quite inefficient because the scheduling of appointments is often reactive in nature and customer-driven. Stated differently, a single customer chooses from a selection of available appointments and, if a customer cancels or reschedules an appointment, the professional service business is left with a perishable commodity that will expire often within a matter of days or even hours. This leaves the support staff with the difficult task of contacting current customers in the hopes that someone will want to fill the newly available time slot. Obviously, this task is labor intensive and costly, with little-to-no guarantee that the additional income generated by the additional appointments will offset the additional costs incurred by the support staff. Equally, there are often customers who may benefit from the newly available time slot, but these customers may only learn of the available appointment time by fortuitously being one of the few customers called or contacted regarding the open appointment time. Accordingly, the professional service business is left with no option other than to hope that a customer contacts them in time to fill the appointment before it expires.

What is needed is a system and a method which is appointment-driven, capable of efficiently utilizing the perishable commodity of available appointments by predicting which of the customers would be most likely to utilize the commodity, and proactively contacting the customer to confirm the appointment. This both maximizes the perishable commodities of the professional service business and provides a convenience to the customer base.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Various embodiments of the disclosure are directed to an automated, scheduled appointment predictor system and method where training logic may use a portion of the labeled data, otherwise termed "training data," to train a predictive appointment model. The system may extract features, or metadata, from the training data and develop weightings and coefficients for these features. These features, and associated weightings and coefficients, are collectively termed as the "predictive appointment model," which may be used to predict which of the customers would be most likely to accept a given appointment. The prediction accuracy of the predictive appointment model may be tested by predicting the occurrence of a different portion of data, separate from that of the training data, termed "validation data"

The appointment prediction logic may then use the successfully tested predictive appointment model to develop prediction preferences for each customer. Here, all of the data may be applied to the predictive appointment model with or without labels. The predictive appointment model may extract features from the data and apply the weightings and coefficients, developed during testing, to predict appointment preference probabilities for each of the customers.

The system may then review the available appointments in the business schedule data and use the predicted preference probabilities to generate a contact list of customers most likely to fill the available appointments. The system may be configured to automatically, without further human intervention, contact the customers on the contact list in order to fill the available appointment slots.

In one embodiment, the system and method may be triggered to rerun the analysis when a certain event occurs or after a time interval has elapsed. In another embodiment, the system and method may review a 'wait list' of customers and offer the available appointments to these customers before automatically contacting the customers on the contact list.

In another embodiment, the system and method may automatically contact one or more customers on the contact list offering one or more optimum appointments. Based on the responses of the customers on the contact list, the system and method may contact further customers, offer additional appointment slots, or rerun the analysis.

In yet another embodiment, the system and method may use the prediction preferences already stored to predict which appointment would best suit walk-in customers who are already in the database or new customers.

I. Terminology

In the following description, certain terminology is used to describe aspects of the invention. For example, in certain situations, the term "logic" is representative of hardware, firmware or software that is configured to perform one or more functions. As hardware, logic may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, logic may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

The term "computing device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

A "message" generally refers to information transmitted in one or more electrical signals that collectively represent electrically stored data in a prescribed format. Each message may be in the form of one or more packets, frames, HTTP-based transmissions, or any other series of bits having the prescribed format.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. Scheduled Appointment Predictor

Figure 1:
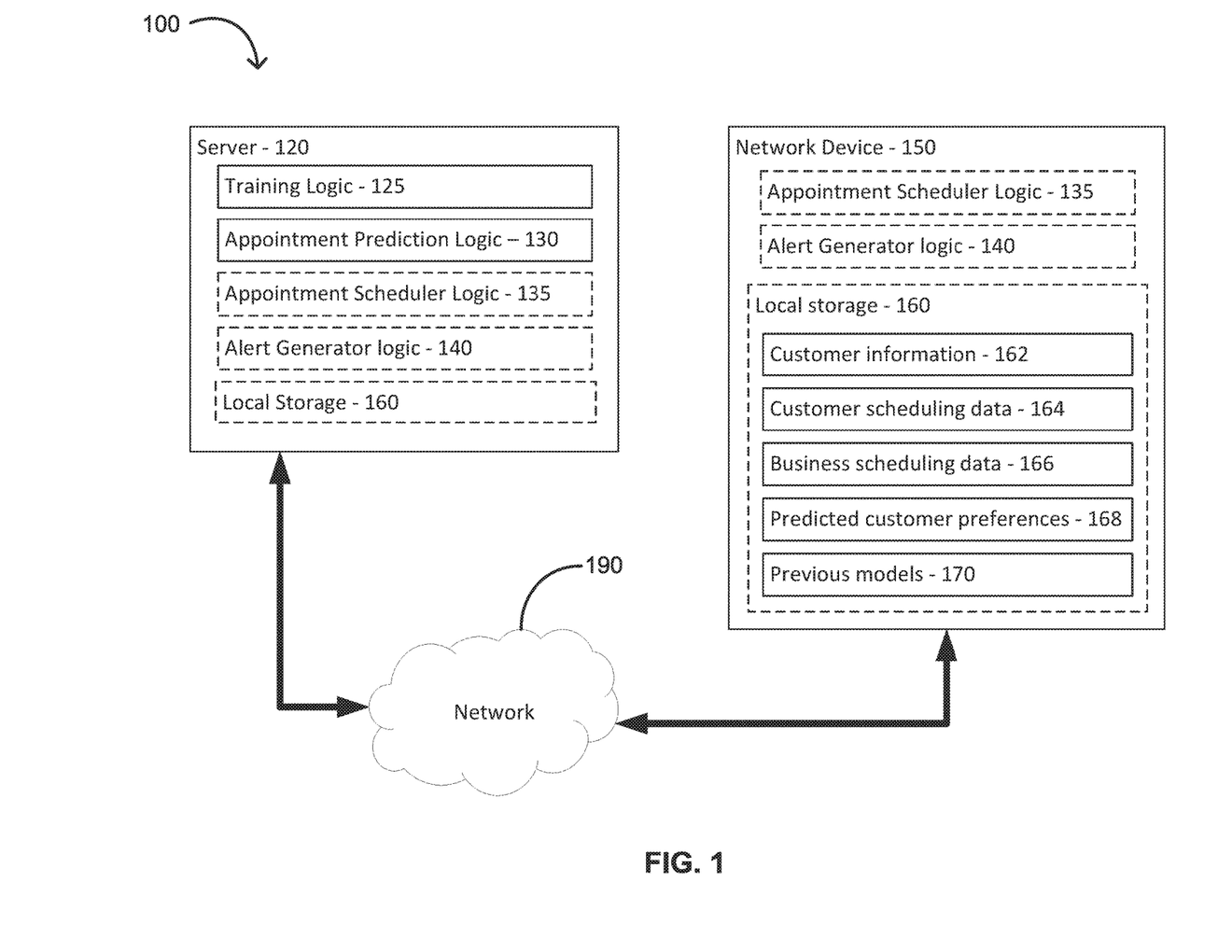
FIG. 1 is an exemplary block diagram of a system including a server and a networked device which include training, appointment prediction, appointment scheduling, and alert generator logic, and data structures including customer information, customer scheduling data, business scheduling data, predicted customer preference data, and previous model data.

Referring to FIG. 1, an exemplary block diagram of a scheduled appointment predictor system 100 is shown. The scheduled appointment predictor system 100 may include one or more computing devices, such as server 120 and networked device 150. With respect to physical architecture, each of the computing devices 120 and 150 includes one or more processors and memory, and these computing devices 120 and 150 may be communicatively coupled together, either directly or indirectly, by means of one or more networks 190. Exemplary network(s) 190, as will be appreciated by those skilled in the art, may be a public network (e.g., internet), a private network (e.g., local area network "LAN", wireless LAN "WLAN", intranet, etc.) or a combination of public and/or private networks.

The server 120 may include training logic 125, appointment prediction logic 130, appointment scheduler logic 135, and alert generator logic 140 as will be described in more detail herein. The server 120 may also include memory (local data storage 160) which may include one or more relational databases.

In an embodiment, one or more of appointment scheduler logic 135, and alert generator logic 140 may be located remotely on a networked device 150. In an embodiment, one or more of the relational databases may be stored remotely, or mirrored on, the local storage 160 of a networked device 150, located on-premises of a business subscribing to an appointment scheduling service. As will be appreciated, in an embodiment, where the logic and relational databases are located only on the server 120, the networked device 150 and network 190 may not be required.

The one or more relational databases stored on local storage 160 of either the server 120 or networked device 150 may include customer information 162, customer scheduling data 164, business scheduling data 166, predicted customer preferences data 168, and previous predictive models data 170. These data may be organized in accordance with a plurality of entries. Each entry of these data may be linked to a different customer, which may be indexed by an identifier assigned to that customer.

The customer information 162 may include personal information related to one or more customers of a business utilizing the predictive appointment scheduling service. Such personal information may include, but is not limited or restricted to, name, gender, age, home address, work address, occupation, social security number, dynamic variables, third party information (e.g., insurance), or the like. As illustrative examples, the "dynamic variables" of the customer information 162 may include requests or preferences provided by the patient. Such requests may include being added to a "wait list" or "emergency list," where customers are notified as to the next available appointment irrespective of any previously defined or predicted preferences. Similarly, a customer may also request to avoid being considered for scheduling during specified date ranges if the customer is knowingly unavailable during that time (e.g., out of town). The "third party information" may include, but is not limited or restricted to, insurance (e.g., medical insurance coverage limits, carrier, etc.); weather; other calendar data (e.g. national holidays, school holidays, sports calendars, or the like); financial information; or any information provided to the system by a third party that may affect the customers scheduling preferences.

The customer scheduling data 164 may include heuristic information pertaining to the past and future scheduled appointments of each customer such as date, time, duration of appointments, time between appointments, the type of appointments booked, and any pre-requisites associated with the appointments. As an illustrative example, the customer scheduling data 164 may include the appointment information of a patient with a doctor at a hospital. Such data may include the date, time, and duration of the past appointments booked with the doctor, as well as for future appointments scheduled. These appointments may include metadata such as "attended", "canceled", "postponed", or "failed to show". These appointments may also be classified by type such as "office visit", "out-patient procedure", or "surgery". Certain types of appointments may have associated pre-requisites such as length of time for the appointment, length of time between appointments, or may affect other unrelated appointments which the patient may have with other doctors who are part of the system. For example, the system may note that a patient has recently had a 'surgery' type of appointment with a Surgeon. Accordingly, this type of appointment would affect the probability of the patient accepting an 'annual physical' appointment with a General Practitioner during the pre-requisite recuperation period for a 'surgery' type appointment.

The business scheduling data 166 includes information directed to the appointment times or time slots offered by each business or professional service individual subscribing to the predictive appointment scheduling service described herein. The business scheduling data 166 may include, but is not limited or restricted to, appointment times or time slots for one or more businesses or professional service individuals, which may include a description (or category) for the appointment time or time slot. Examples of type of descriptions (or categories) may include category of appointment (e.g. 'office visit', 'procedure', 'surgery', 'annual physical', etc.), status of appointment (e.g. 'available', 'unavailable', 'booked', 'cancelled', etc.), or the like. Predicted customer preferences 168 and previous predictive models data 170 may will be discussed in more detail herein.

As further shown in FIG. 1, and as will be discussed in more detail herein, the server 120, may include training logic 125 configured to perform functions to train the predictive appointment model. The appointment prediction logic 130, may include logic configured to apply data from one or more of the relational databases to the trained, predictive appointment model to generate or update the predicted customer preferences data 168. The server 120, or the networked device 150, may include appointment scheduler logic 135 configured to determine, based on the predicted customer preferences 168, which of the customers would most likely fill the available appointments from the business scheduling data 166. The alert generator logic 140, as will be discussed in more detail herein, may include logic configured to contact the customers in order to fill the available appointments.

Figure 2:
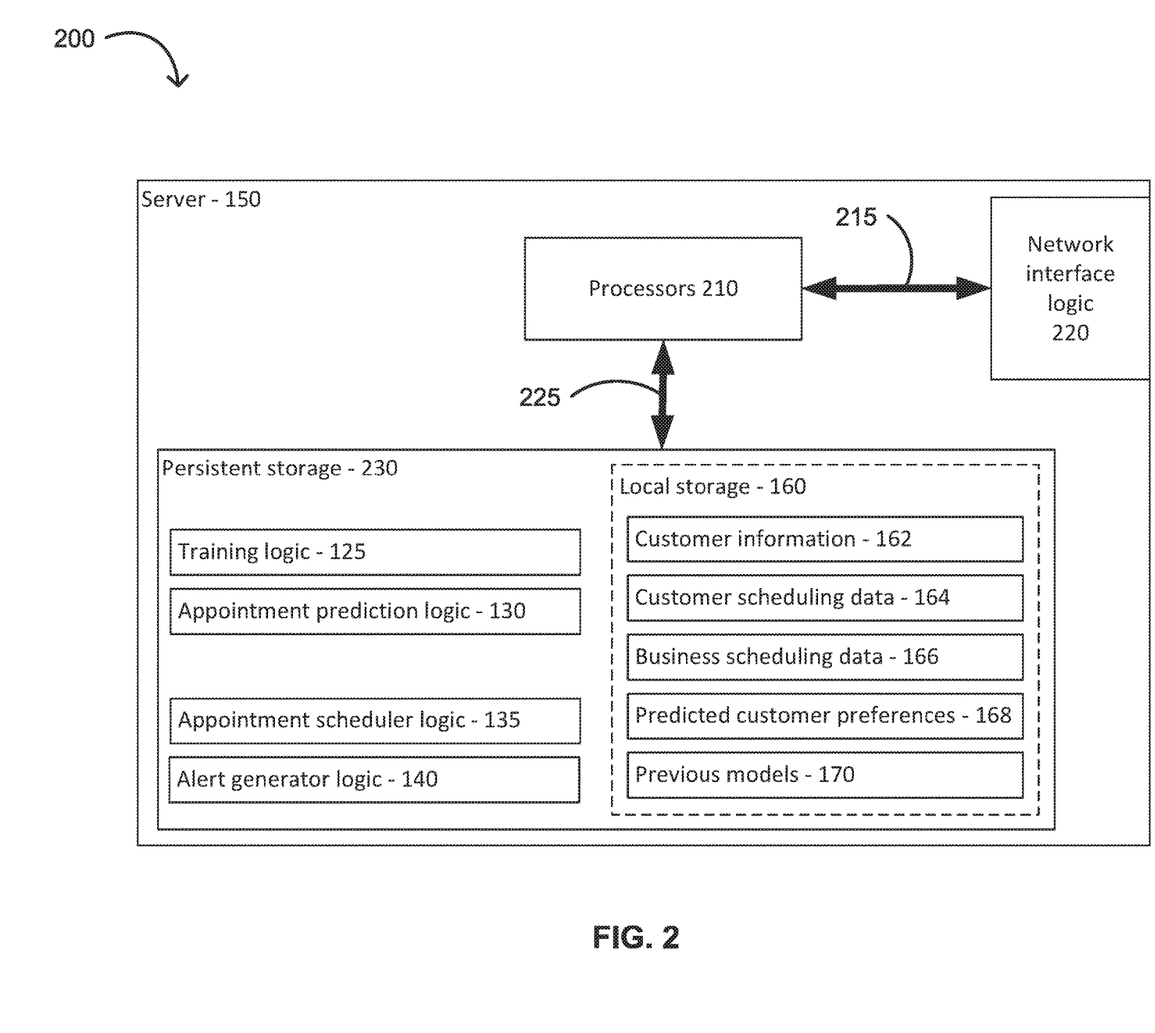
FIG. 2 is an exemplary block diagram of a device that may be used by the system of FIG. 1.

Referring to FIG. 2, an exemplary embodiment of a computing device 200 which may be used as part of the scheduled appointment predictor system 100 is shown. The computing device 200 may deployed as either a server 120, or a networked device 150. As shown in FIG. 1, while one or more of the logic or relational databases of local storage 160 may be stored remotely on a network device 150, it will be appreciated that one or more of these logic or relational databases may also be stored on the local storage 160 of server 120.

The computing device 200 includes one or more processors 210, which are communicatively coupled to a network interface logic 220 via a first transmission medium 215. The network interface logic 220 enables communication with one or more the endpoint devices (e.g., mobile smart phone, tablet, laptop, desktop computer, etc.) via the network 190 (not shown). According to an embodiment of the disclosure, the network interface logic 220 may be implemented as a physical interface including one or more ports for wired connectors. In an embodiment, the network interface logic 220 may be implemented with one or more radio units for supporting wireless communications with other electronic devices. In an embodiment, the network interface logic 220 may be software, hardware or a combination thereof that provides instructions for handling incoming and outgoing network traffic and operating as a memory controller to locate logic for processing by the processor(s) 210.

The processor(s) 210 is further coupled to persistent storage 230 via a second transmission medium 225. According to an embodiment of the disclosure, persistent storage 230 may include training logic 125, appointment prediction logic 130, appointment scheduler logic 135, and alert generator logic 140. Of course, when implemented as hardware, one or more of these logic units could be implemented separately from each other. Server 120 may also include local storage 160 which may store customer information 162, customer scheduling data 164, business scheduling data 166, predicted customer preferences 168, and previously saved predictive appointment models 170 as described herein.

Figure 3:
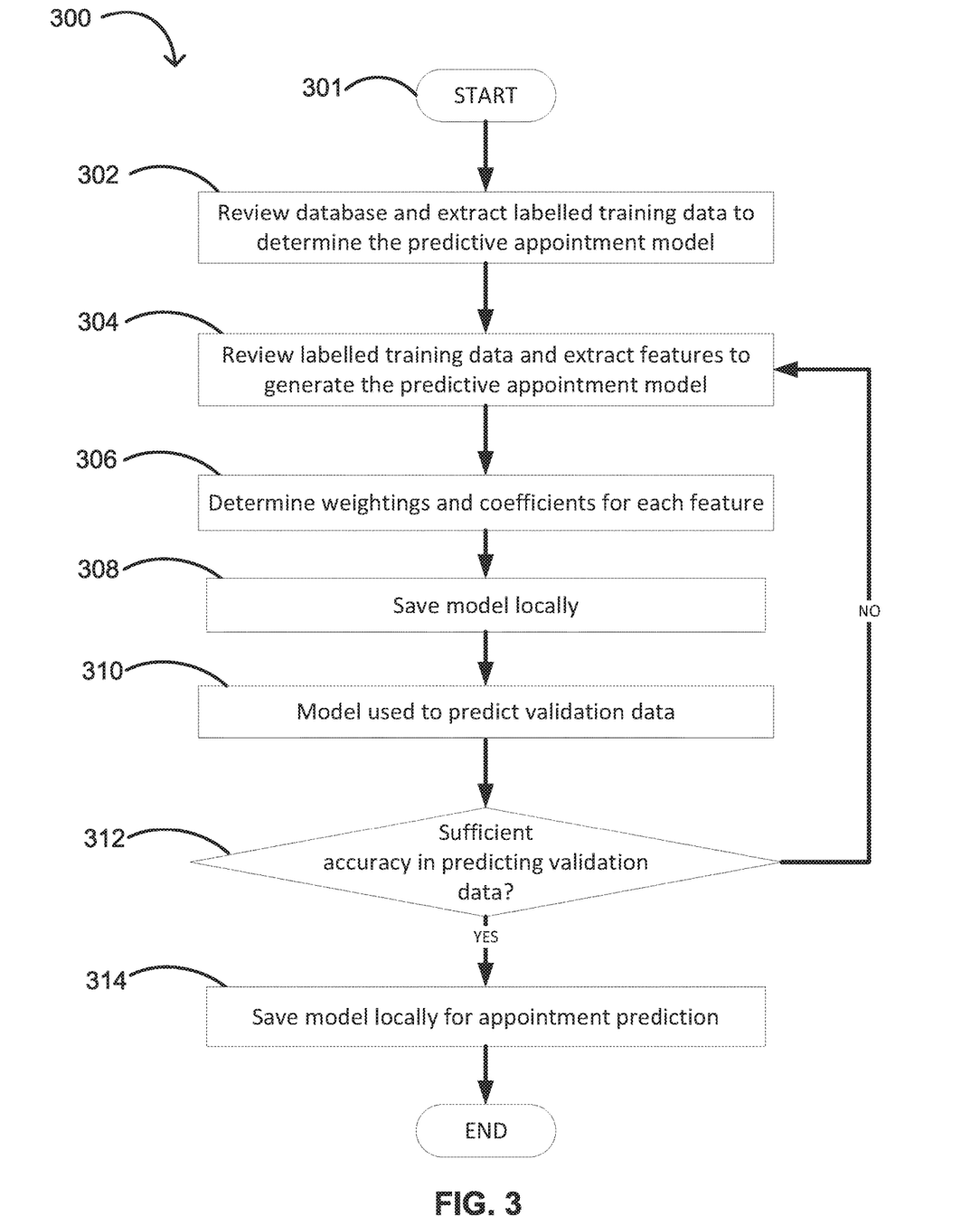
FIG. 3 is an exemplary flow-diagram of a training process carried out by the training logic.

Referring to FIG. 3, an exemplary training process 300 executed by the training logic 125 of FIGS. 1-2 is shown. The training process 300 is initiated by a triggering event, which may be a time-driven trigger, an action-driven trigger, or combinations thereof (operation 301). By way of non-limiting examples, time-driven triggers may include a certain time of day such as noon, midnight, before or after the workday, after a given amount of time has elapsed, or at a similar time or time interval. Action-driven triggers may include automated triggers, manual triggers, or autonomous triggers. Automated triggers may include, but not limited or restricted to, the addition of a new customer, the addition of a new appointment, the provision of a new appointment slot, the modification of an existing appointment, or the like. Manual triggers may include, but not limited or restricted to, the initiation of the process by a human operator, or the like. Autonomous triggers may include, but not limited or restricted to, triggers determined by the system itself, such as if the system determines a drop in accuracy of the predictive appointment model, or if the system determines inefficiencies in the scheduling, or the like.

After the training process 300 has been triggered, the training logic 125 of FIGS. 1-2 reviews data from the relational databases (e.g., customer information data 162, customer scheduling data 164, previously saved predicted customer preferences 168, previously saved predictive appointment models 170) and extracts labelled training data with which to determine the predictive appointment model (operation 302). The labelled data may include appointments where the identity of the customer who accepted the appointment is already known. As described herein, the extracted training data may include only a portion of the entries available in the relational databases. Data within the other entries of the relational databases, separate from that of the training data, may be 'held back' and used to verify the predictive appointment model, termed "validation data". In an embodiment, the training data may be randomly selected, or may be selected based on an order, for example, chronological order, alphabetical order, or numerical order. The percentage of validation data 'held back' may be less than forty percent (40%) of the available data, such validation data may range between five percent (5%) and thirty-five percent (35%), such validation data may be substantially twenty percent (20%). The percentage of validation data may be predetermined, randomly selected, or autonomously selected by the system 100.

The training logic 125 then reviews the training data and generates an initial predictive appointment model. The training logic 125 may use various machine learning techniques to generate the predictive appointment model, in an exemplary embodiment the training logic 125 may use a random forest machine learning technique, although other machine learning techniques, including Logistic Regression, Naive Bayes (Multinomial), k-Nearest Neighbors, Deep Neural Networks, "Beta-geometric/NBD" (BG/NBD), Support Vector Machines, and other machine learning, statistical learning, or artificial intelligence (A.I.) techniques may also be used and fall within the scope of the present invention. The training logic 125 may extract a set of features (operation 304), and assign various weightings and/or coefficients for each of the features (operation 306), which are used to generate an initial predictive appointment model. This initial predictive appointment model may then be used to determine an initial set of customer preference probabilities 136. Both the initial predictive appointment model and the initial set of customer preference probabilities may be saved locally (operation 308).

To test the accuracy of the initial predictive appointment model, the training logic 125 uses the initial set of customer preference probabilities 136 to predict the labels of the validation data (operation 310). In other words, for a number of historical appointments that were not used to train the model, the predictive appointment model attempts to predict the customer who accepted the appointments, where the identity of the customer for the appointment is already known. Since the labels (customer identity) of the validation data are already known, a percentage accuracy of the predictive appointment model may be established by comparing the predicted labels with that of the known labels. The process may then loop back to operation 304 where alternate features, weightings and coefficients, may be extracted from the training data. The process continues through operations 306, 308, 310 as described herein, and compares the accuracy of the current predictive appointment model with that of the previously saved predictive appointment model(s) that have been generated.

By comparing the degree of increase or decrease in accuracy of the predictive appointment models as they are generated, the process will continue to loop back to operation 304 until an optimum accuracy of the predictive appointment model has be achieved (operation 312). Hence, the training logic 125 'learns' as to which features, weightings and coefficients constitute the optimum predictive appointment model based on the current data available. Once the optimum predictive appointment model is determined, the predictive appointment model is saved either locally on the server 120, remotely on the networked device 150, or a combination thereof (operation 314).

Figure 4A:
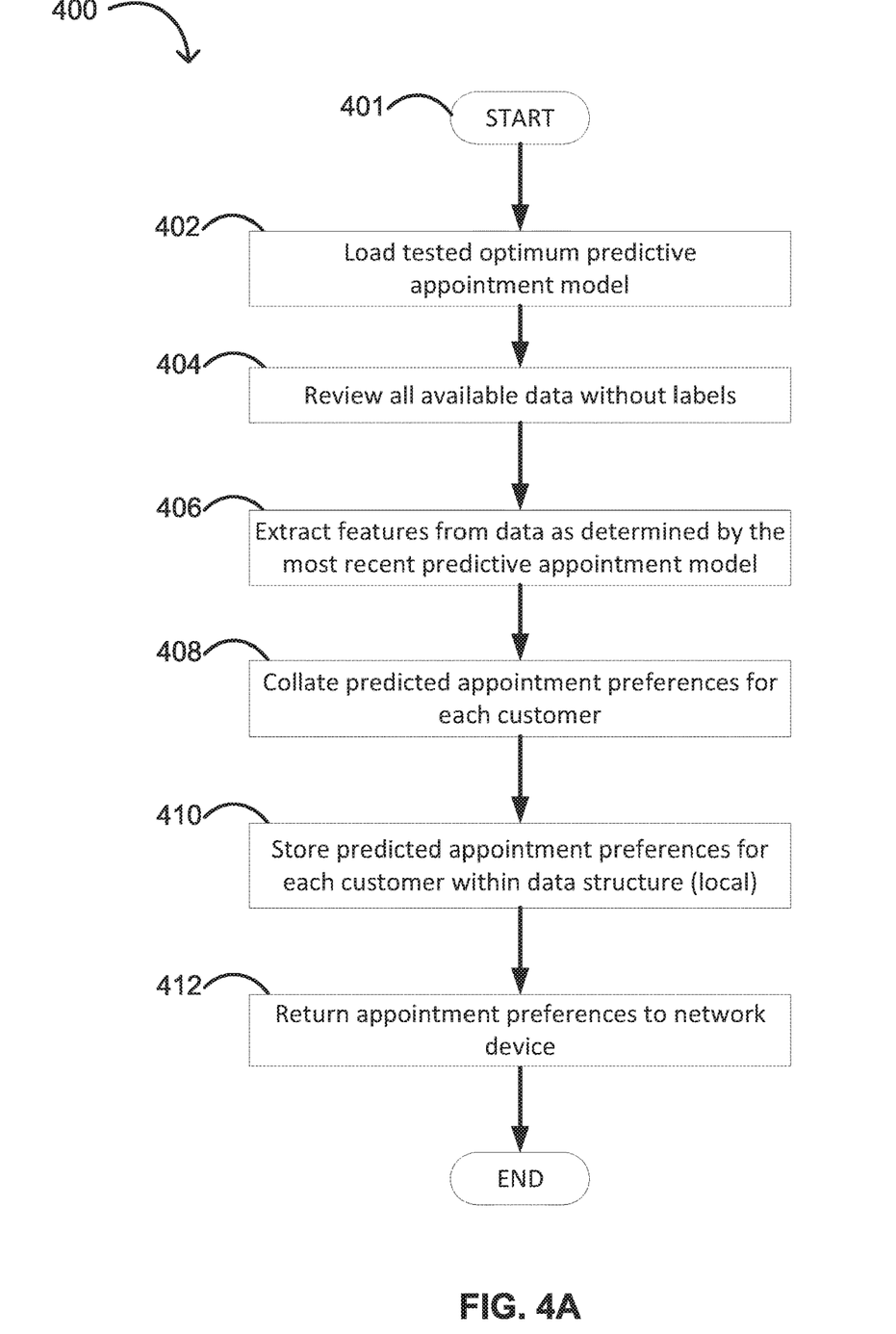
FIG. 4A is an exemplary flow-diagram of an appointment prediction process carried out by the appointment prediction logic.

Referring to FIG. 4A, an exemplary process 400 executed by the logic of the appointment prediction logic 130, is shown. Once successfully tested, the appointment prediction logic 130 then applies the optimum predictive appointment model to all of the available data in the local storage 160, to generate predicted appointment preferences for each customer. These preferences may then be used to predict the labels (customers) most likely to accept future available appointments (unlabeled data).

The prediction process 400 is initiated in response to a triggering event being different than the event that triggered the training process 300 of FIG. 3 (operation 401). As before, the triggering event may be time-driven or action-driven triggers, as described herein. The appointment prediction logic 130 loads the selected predictive appointment model, which is generated and tested by the training logic 125 (operation 402). Thereafter, the appointment prediction logic 130 reviews the data in the local storage 160, without labels (operation 404). The data may include customer information 162, customer scheduling data 164, previously saved predicted customer preferences 168, and previously saved predictive appointment models 170. The appointment prediction logic 130 uses the model to extract features from the data and uses the weightings and coefficients for each of the features to predict appointment preferences for each customer (operation 406). These predicted preferences are then collated and stored locally in a relational database (operations 408 & 410). These stored predicted customer preferences may then be used to update the customer preferences database 168 which may be stored locally at the server or remotely on-premises at the network device (operation 412).

Figure 4B:
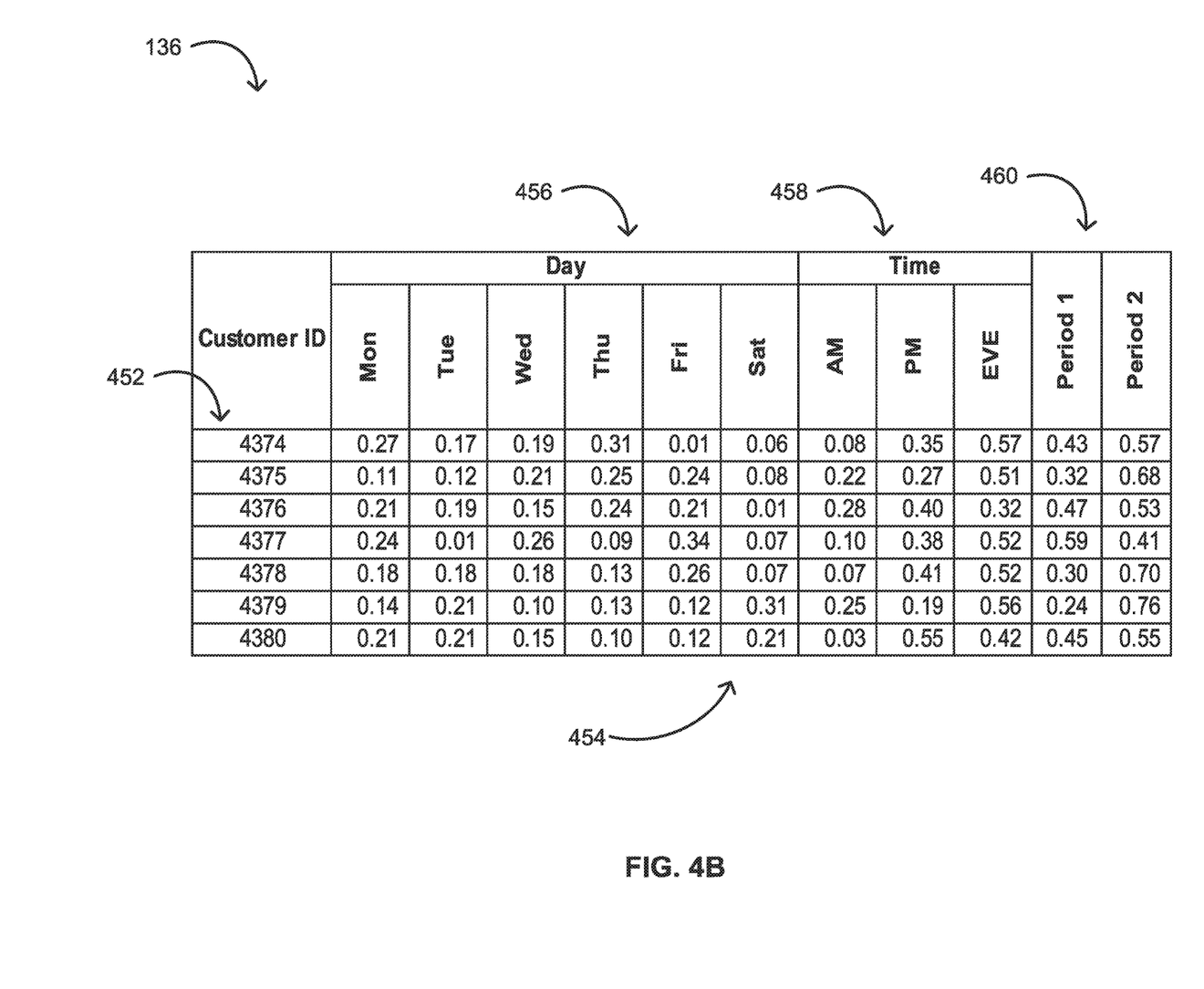
FIG. 4B is an exemplary illustration of prediction values generated by the appointment prediction logic.

Referring to FIG. 4B, an exemplary embodiment of a customer preference database 168, which is generated by the appointment prediction logic 130, is shown. The customer preference database 168 lists all of the customers in the customer database, a sample of which are shown in the table denoted in the row headings by customer ID numbers 452. As described herein, the predictive appointment model generates a series of predicted appointment preferences, denoted by probabilities 454, for each of the customers in the local storage 160. These probabilities 454 identify a predicted likelihood of the customer accepting an appointment at a given day 456 and time 458. While FIG. 4B shows six days and three time slots, it will be appreciated that any number of days, dates, date ranges, and time slots may be shown and fall within the scope of the present invention.

As an illustrative example, the customer preference database 168 of FIG. 4B shows a range of probabilities 454, denoted by numbers between 0.00 and 1.00, for the various appointment days and times. Referring to customer #4374, the predictive appointment model shows this customer has a higher preference for appointments on Mondays (0.27) and Thursdays (0.31) compared with that of Fridays (0.01) and Saturdays (0.06). The predictive appointment model also predicted that customer #4374 shows a higher preference for appointments in the evenings (0.57) rather than the mornings (0.08) or afternoons (0.35). Accordingly, should an appointment become available on a Monday evening, the appointment scheduler logic 135 may reference the customer preference database 168 and may include customer #4374 on a contact list since this customer would be likely to accept an appointment at this time. It will be appreciated that this example is highly simplified, and that various additional data may also be taken in to account when determining the probability that a customer will accept an appointment.

In an embodiment, the logic may also use a statistical model where, in addition to the probabilities of day and time, the model may also predict the likelihood that a customer may request an appointment within a given period. A period may be the forth-coming week, fortnight, or month, although other time periods are contemplated to fall within the scope of the present invention. Accordingly, as an illustrative example, the model may generate probabilities 454 for each customer 452 which predict the customer's preference for appointments on a given day 456 and at a given appointment time during the day 458. These probabilities may be calculated using the percentage of historical appointments per day, or per hour, for each individual customer. In addition, the model may also provide the probability as to whether the customer will request an appointment during the up-coming period, or periods, e.g. during that week, or subsequent weeks. Exemplary statistical models for generating such outputs may include beta-geometric/NBD (BG/NBD), as described by Fader et al., ""Counting Your Customers" the Easy Way: An Alternative to the Pareto/NBD Model", Marketing Science, May 1, 2005 (https://doi.org/10.1287/mksc.1040.0098), which is herein incorporated by reference. However, it will be appreciated that other statistical models which generate similar outputs may be used, and fall within the scope of the present invention. Here, the following nomenclature may be used as part of the BG/NBD model:

Frequency: represents the number of repeat appointments the customer has made, where, for example if the units are weeks, the count is that of units (weeks) that the customer had an appointment on.

T: represents the 'age' of the customer in an appropriate time unit, where 'age' may be total age of user in years or age of user as part of the system.

Recency: represents the 'age' of the customer when they made their most recent appointment. Where 'age' is equal to the duration between a customer's first appointment and their latest appointment.

Accordingly, this model may provide probabilities for each customer, predicting if they are going to make an appointment in the next period (e.g. next week). Thus, continuing the illustrative example of customer #4375, where a period is equal to a week, should appointments become available on Monday evenings, this model may show the customer as less likely to accept a Monday evening appointment during the forthcoming period (0.43), compared with that of the subsequent period (0.57). Again, it will be appreciated that this is a highly simplified example, and that various additional data may also be taken in to account when determining the probability that a customer will accept an appointment. Implementation of such models may use the 'Python' programming language, although other programming languages may be used, as will be understood by those skilled in the art.

In an embodiment, additional data may be included to further refine the probability of a customer accepting the appointment. These additional data may include, for example, dynamic variables or third party information. As previously noted, while some dynamic variables or third party information may have been included as part developing the model it is contemplated that some dynamic variables or third party information may only become available after the model has been developed. In which case the system may further refine or modify the customer preferences or customer contact list accordingly.

As an illustrative example, the system may be triggered overnight to predict the customer most likely to accept any available appointments for the next day. However, after the model has been run, a customer may request to be added to the 'wait list' for the next available appointment. Accordingly the system may modify the customer preferences, for that particular customer, to show a high probability of accepting any appointments for that day, and then rerun the appointment scheduler logic 135. Alternatively the system may add the customer to the top of the customer contact list and rerun the alert generator logic 140. In an embodiment, the system 100 may generate a separate customer list for 'wait list' customers that the appointment scheduling logic 135 or alert generator logic 140 may refer to first.

As an illustrative example, these additional data may also include third party information such as weather, traffic conditions, or the like. As an illustrative example, a given customer may typically have a high probability of accepting an appointment for that day, however the model may also shows the customer as having a high probability of cancelling appointments when the weather is bad. The system 100 may then use updated weather forecasts after the model has been run to subsequently modify either the customer preferences or the contact list as previously described. Accordingly, the system 100 may further adapt the output based on new or changing data as it becomes available.

Figure 5A:
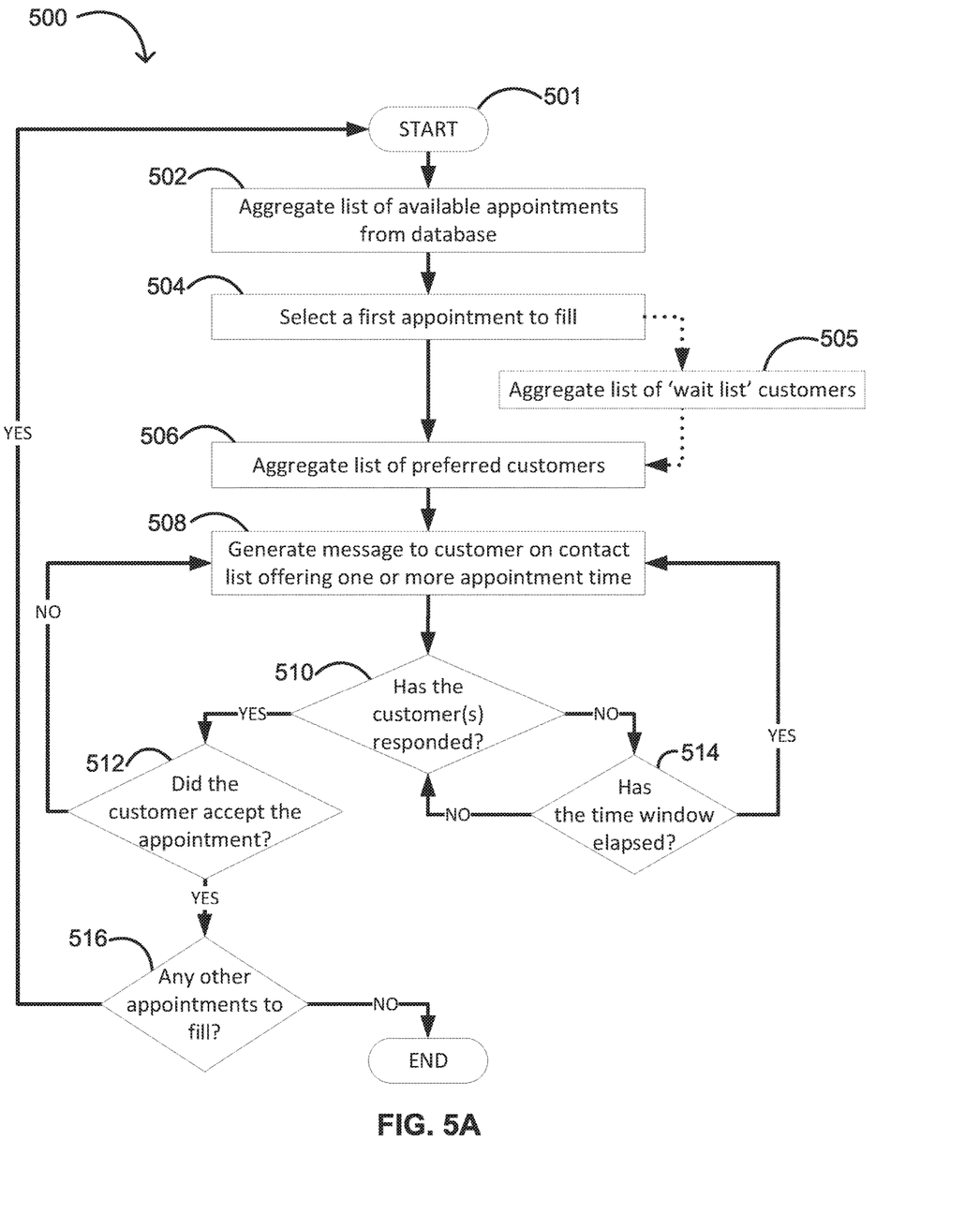
FIG. 5A is an exemplary flow-diagram of a scheduling and alert process carried out by the appointment scheduler logic.

Referring to FIG. 5A, an exemplary process 500 executed by logic of the appointment scheduler logic 135 and alert generator logic 140, is shown. The scheduling process 500 is initiated in response to a triggering event being different than the event that triggered the training process 300 or prediction process 400 of FIGS. 3 & 4 (operation 501). As before, the triggering event may be time-driven or action-driven triggers, as described herein. The appointment scheduler logic 135 aggregates available appointments from the business scheduling database 166 and determines which appointments are required to be filled (operation 502). The range of appointments to be filled may be predetermined, for example the system may only look to fill appointments within the next day, 24 hours, week, or the like. In an embodiment, the range of appointments to be filled may be determined autonomously by the system 100. For example, the system may fill appointments based on confidence levels. However, some appointments may be more difficult to predict, such as those further in the future, accordingly the system may not fill certain appointments until closer to the appointment time or until further data is available. In this way the system 100 autonomously determines which appointment(s) is to be filled (operation 504).

In an embodiment, the appointment scheduler logic 135 may review customer information 162 for any additional data, dynamic variables (e.g. 'wait list' requests), third party data, or the like. For example, certain customers may have indicated a preference to be added to a 'wait list' (operation 505) for the next available appointment, irrespective of their predicted appointment preferences. If these requests haven't already been included in the predictive appointment model, the appointment scheduler logic 135 may then prioritize these customers when generating the list of customers who would be most likely to fill the selected appointment (operation 504).

For each available appointment, the appointment scheduler logic 135 may aggregate a contact list of preferred customers (operation 506). Here the appointment scheduler logic 135 reviews the probabilities stored in the customer preferences database 168 and determines which of the customers would be most likely to fill the selected available appointment. It will be appreciated that more than one customer may be likely to accept a given appointment. Equally a given customer may be likely to accept more than one appointment. Further, as previously noted, where customers have indicated a preference to be added to a 'wait list', i.e. will accept any next available appointment, these customers will be prioritized on the customer contact list. Accordingly, the appointment scheduler logic 135 may generate a list of customers to contact for each appointment. The list of preferred customers may be, by way of a non-limiting example, a hierarchy of customers ranked in order of descending probability of accepting the appointment.

Figure 6:
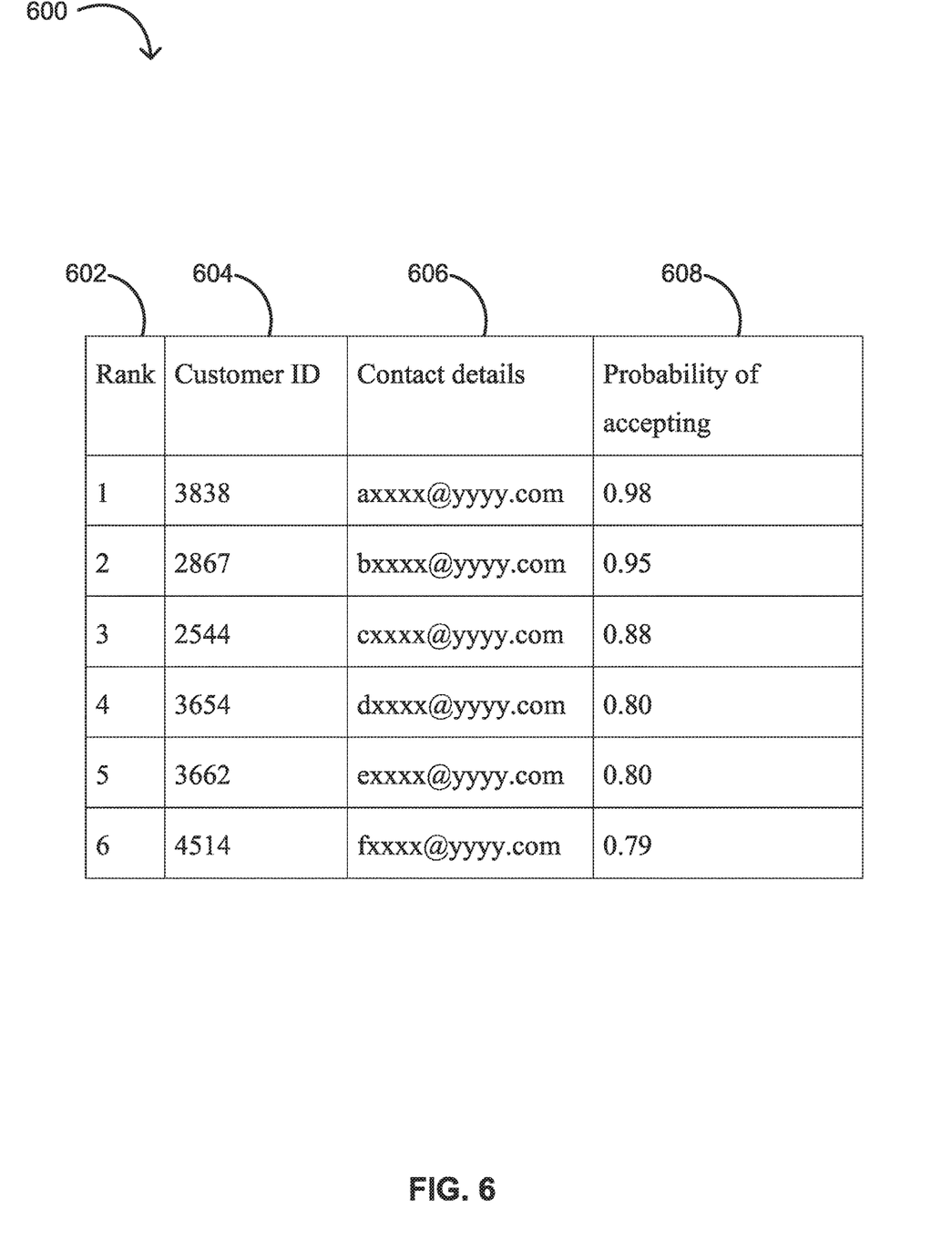
FIG. 6 is an exemplary illustration of a customer contact list generated by the appointment scheduler logic.

Referring to FIG. 6, an exemplary contact list generated by the appointment scheduler logic 135, is shown. The contact list 600 may include a list of potential customers, identified by their customer ID number 604, and include preferred contact details 606, and the calculated probability of accepting the appointment 608. The list may be ranked 602, for example, in order of probability of accepting the appointment.

Referring back to FIG. 5A, the appointment scheduler logic 135 may then provide the customer contact list to the alert generator logic 140 where the alert generator logic 140 may generate one or more messages, to one or more customers on the contact list offering the available appointment (operation 508). It will be appreciated that the message generated by the system may include an e-mail, text message, voicemail, phone call, social media message, notification by way of a dedicated program or 'app', or similar form of contacting a customer. The message generated by the system may offer one or more appointments to the customer. Available appointments may be offered in order of preference, likelihood of accepting, chronologically, or similar such order. The message may include links providing the customer with various appropriate responses to the message. By way of non-limiting examples, such responses may be 'accept', 'decline', 'think about it', 'let me check', 'show me other appointments', or the like.

As shown in FIG. 5A, in an embodiment, the alert generator logic 140 may contact the customers in a linear order, starting with the customer ranked as most likely to accept (operation 508). If the first customer responds (operation 510) within a given time window and accepts the appointment (operation 512), the appointment has been filled. The alert generator logic 140 then determines if there are further appointments to fill (operation 516), and if so the process loops back to restart the process. This process will keep looping through until all appointments have been filled. If no further appointments are to be filled the process ends.

If the first customer responds within a given time window (operation 510) and declines the appointment (operation 512), the alert generator logic 140 then generates a message to the next customer on the contact list (operation 508), ranked as second most likely to accept the appointment. If the customer ranked first on the list, who was initially contacted, fails to respond within a given time window (operation 514), the alert generator logic 140 then generates a message to the following customer on the contact list (operation 508), ranked as second most likely to accept the appointment. Accordingly, as will be appreciated, the alert generator logic 140 continues through the process until all of the appointments have been filled or all of the customers have been contacted. If there are still appointments left to be filled and all of the customers have been contacted but not all have responded, the alert generator logic 140 may autonomously extend the time window with which to expect a reply. In an embodiment the alert generator logic 140 may cycle back to the start to generate a new contact list and continue the process until all the available appointments have been filled.

In an embodiment, if the customer responds after the time window has expired, the system may either confirm the appointment, if the appointment is still available, or may be triggered to generate a list of alternative appointments for the customer to choose from. It is contemplated that the list of alternative appointments for a customer may also be included in the initial contact message so as to expedite the process should the initial appointment be unsuitable. The system may store the customer response data as part of the customer scheduling data 164 and may use these data as part of the training process 300.

Figure 5B:
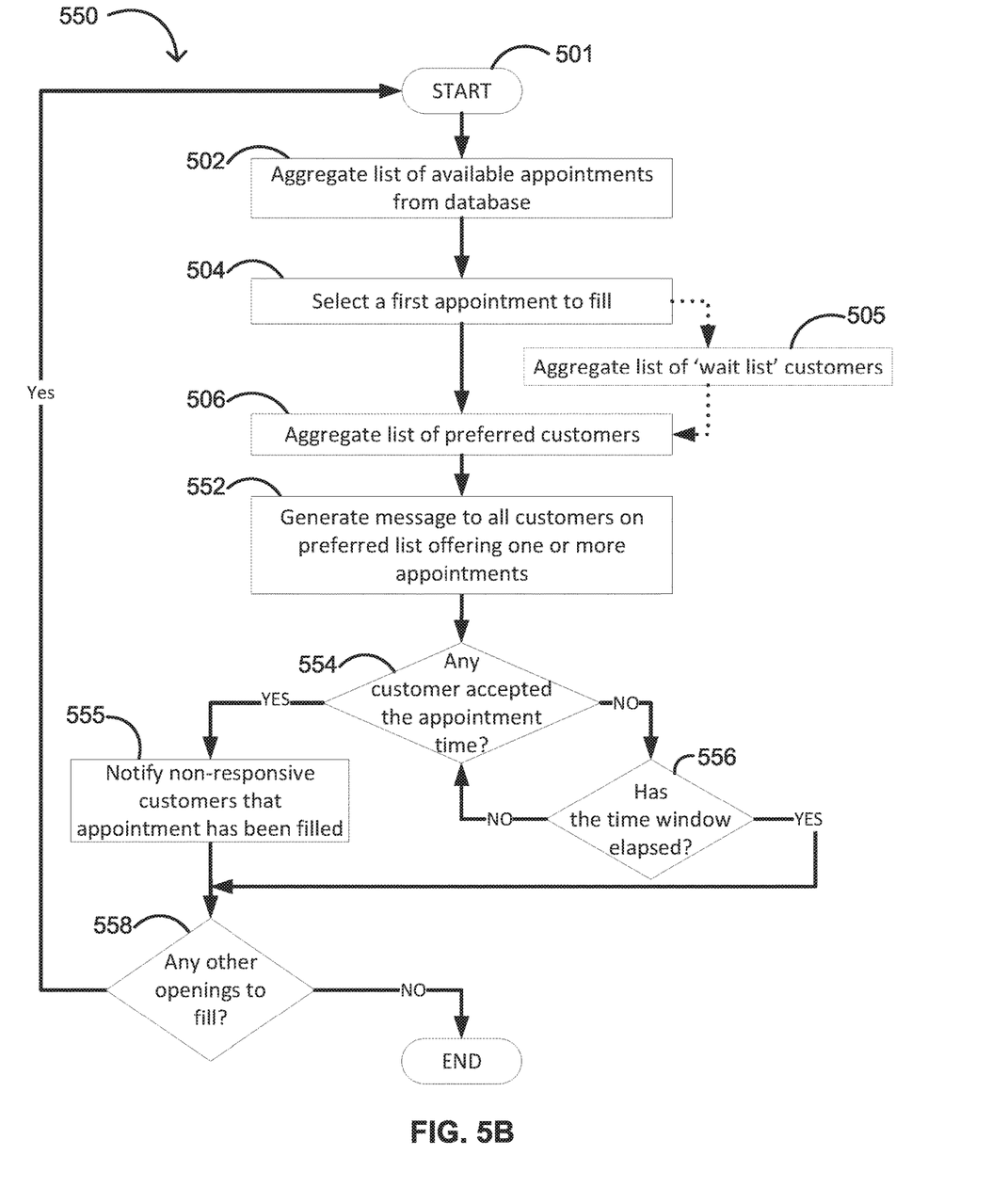
FIG. 5B is an exemplary flow-diagram of a scheduling and alert process carried out by the appointment scheduler logic.

Referring to FIG. 5B, in an embodiment, the appointment scheduler logic 135 and alert generator logic 140 may contact all of the customers on the contact list simultaneously, on the basis of a 'first-come-first-served' basis, i.e. the first customer to accept the appointment. The process starts, aggregates a list of available appointments, and aggregates a wait list and contact list, as described herein (operations 501-506). The alert generator logic 140 then sends a message to all of the customers on the contact list offering the available appointment (operation 552). The appointment is filled by the first customer to respond accepting the appointment (operation 554).

Once the first customer has responded to accept the appointment, the alert generator logic 140 notifies the remaining, non-responsive, customers that the appointment is no longer available (operation 555). The system then assess whether further appointments need to be filled (operation 558) and may loop back to the start in order to generate a new contact list based on the remaining available appointments. It will be appreciated that those non-responsive customers from the initial contact list may be prioritized in the subsequent contact list. In this way, if the appointment has been filled before a contacted customer has replied, a new appointment may be offered. It will be appreciated that a preferred appointment slot as well as one or more alternate appointment slots may be offered to the customer as part of the initial message. Accordingly, should the preferred appointment slot be unsuitable, or should the preferred appointment slot be filled before the contacted customer has had a chance to reply, the customer may already have a choice of other appointment slots to choose from, thereby expediting the procedure and reducing the number of messages sent to the customers.

There may also be a time window so that should none of the customers reply within the time window, the process starts over to generate a new contact list of customers (operation 556). It is contemplated that any response, or lack thereof, given by a customer to the initial messages (operations 508, 552), will be taken into account by the system 100 when determining the probability of the customer being a suitable candidate for subsequent contact lists. If no further appointments are available the process ends.

Figure 5C:
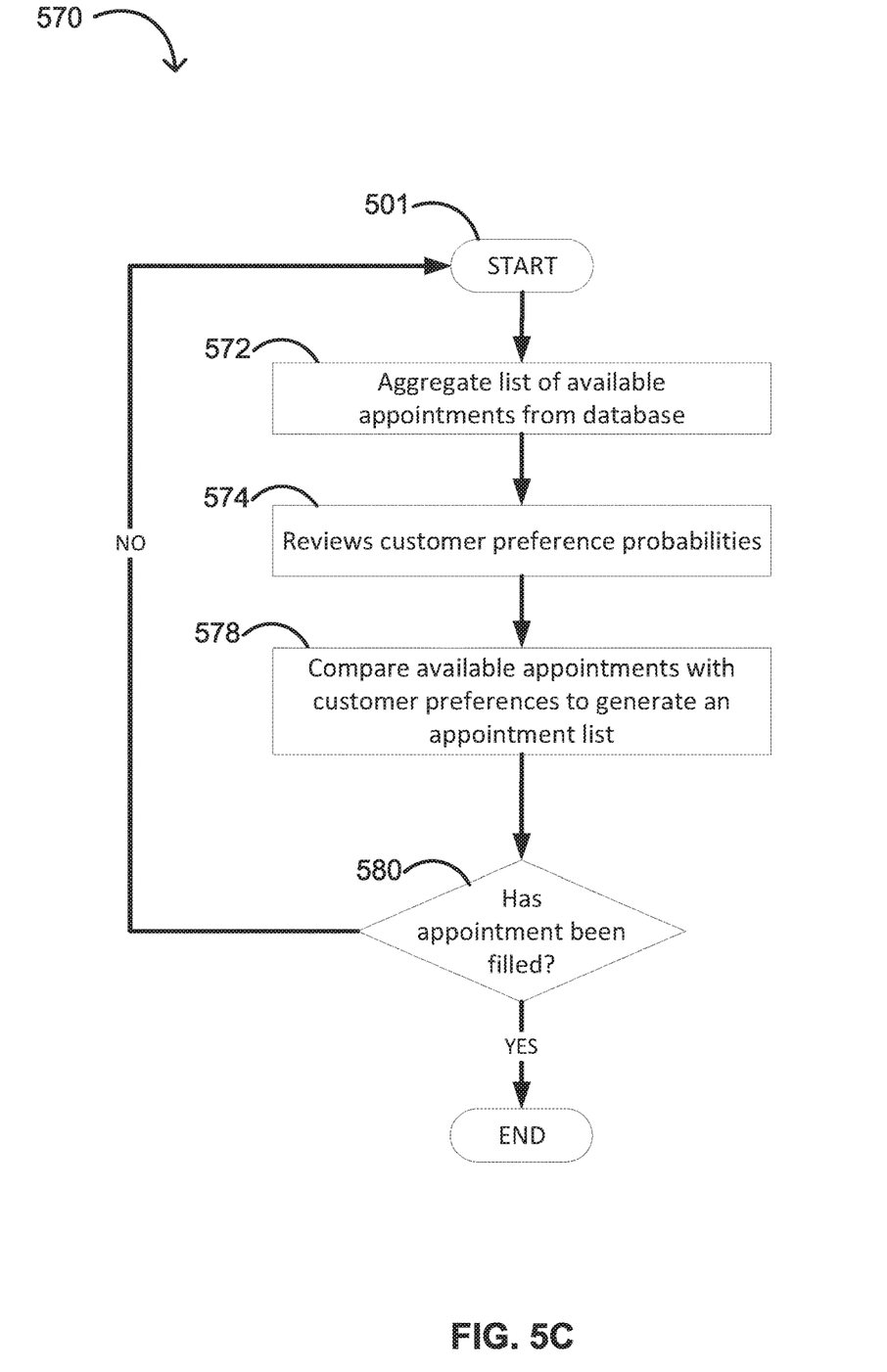
FIG. 5C is an exemplary flow-diagram of a scheduling and alert process carried out by the appointment scheduler logic.

As described herein, the present disclosure has been used in an appointment-driven way, in so far as a single appointment has been filled by contacting multiple customers. However, in an embodiment, the system 100 may also be used in a customer-driven way. Referring to FIG. 5C, where an exemplary process of a customer-driven process is shown. A customer that is already included in the system 100 and therefore already has customer preferences 168 defined according to the most recent predictive appointment model, may contact the business enquiring about an appointment.

Here, the appointment scheduler logic 135 may be triggered manually 501, where the appointment scheduler logic 135 aggregates a list of available appointments (operation 572). The appointment scheduler logic 135 then reviews the customer preference probabilities (operation 574) for the particular customer, as stored in the most recent customer preferences database 168. The appointment scheduler logic 135 then compares the available appointments with the customer preference probabilities, for that particular customer, to provide a list of possible appointments (operation 578). It is contemplated that the customer preference probabilities may be modified or refined by additional data, such as specific requests provided by the customer when requesting an appointment. Such requests may include the next available irrespective of preference probabilities, or appointments within a given temporal range. In this way, appointments that are most likely to be suitable to, or preferred by, the customer may be offered (operation 580). This provides the advantages of expediting the scheduling process as well as deepening customer trust in the particular business by showing a personalized appreciation of the customer's needs and requirements.

In an embodiment, the system 100 may also be used in a customer-driven way with new customers who were not previously included in the system 100. It is contemplated that when entering a new customer in to the system 100, sufficient features may be extracted from the data, by the most recent predictive appointment model, in order to determine a list of available appointments that would be most suited to the new customer. As an illustrative example, in the process of entering a new customer to the database, certain information regarding demographics, occupation, home/work location, specific requests, or the like may be entered. The most recent predictive appointment model as defined by the existing customer base may show the customers of similar demographics, occupation, home/work location preferred appointments at certain times. Accordingly, the appointment scheduler logic 135 may provide a list of appointments weighted towards these appointment slots as well as accommodating any specific requests. In this way the appointments that are most likely to be suitable to the customer may be offered even though no previous scheduling behavior for the customer has been established on the system 100. This provides similar advantages of expediting the scheduling process and as well as inspiring customer trust in a new customer for the particular business.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having stored thereon instructions and deployed within a computing device, the instructions being executable by one or more processors to perform operations comprising:
    responsive to an automated or autonomous trigger, training an initial predictive appointment model by the one or more processors operating in accordance with a machine learning technique based on extracted features from a training data set being a first portion of data from a dataset and testing the trained predictive appointment model based on a validation data set being a second portion of data from the dataset to generate a tested predictive appointment model;
    applying the tested predictive appointment model to a dataset to generate customer appointment preference probabilities, wherein the generated customer appointment preference probabilities are maintained in a local storage;
    aggregating a list of available appointments;
    generating a contact list for a plurality of customers most likely to accept one of the appointments from the list of available appointments based on the customer appointment preference probabilities; and
    automatically generating and transmitting electronic messages by the one or more processors over a network from the computing device to at least a computing device associated with each of the plurality of customers offering one or more available appointments and assigning an appointment of the one or more available appointments to a first customer of the plurality of customers accepting the appointment by returning a response electronic message over the network to one of the electronic messages within a prescribed time window.

2. The non-transitory storage medium of claim 1, wherein the automated trigger includes any of (i) an addition of a new customer, (ii) an addition of a new appointment, (iii) a provision of a new appointment slot, or (iv) a modification of an existing appointment.

3. The non-transitory storage medium of claim 1, wherein testing the trained predictive appointment model includes autonomously testing different combinations of features, weightings and coefficients until an optimum prediction accuracy is achieved to generate the tested predictive appointment model.

4. The non-transitory storage medium of claim 1, wherein the autonomous trigger includes any one of (i) a prescribed decrease in accuracy of a current predictive appointment model or (ii) a prescribed determination of inefficiencies in the scheduling of the list of available appointments.

5. The non-transitory storage medium of claim 4, wherein the messages provided to the plurality of customers include a selection of possible responses.

6. The non-transitory storage medium of claim 5, wherein responsive to at least the first customer of the plurality of customers accepting the appointment, generating, by an alert generation logic, a notification message to remaining non-responsive customers of the plurality of customers that the appointment is no longer available and generating and transmitting messages by appointment scheduling logic to a second plurality of customers upon the appointment scheduling logic determining that at least one appointment of the one or more appointments is available, the second plurality of customers includes the remaining non-responsive customers assigned priority over any new customer included as part of the second plurality of customers to provide one or more alternate available appointments.

7. The non-transitory storage medium of claim 1, wherein the electronic messages include audio signaling associated with a telephone call transmitted over a telecommunication network.

8. The non-transitory storage medium of claim 1, wherein the electronic messages include a text message transmitted over the network.

9. The non-transitory storage medium of claim 1, wherein the local storage corresponds to one or more databases.

10. A system for establishing a predictive appointment scheduling system, the system comprising:
    one or more processors; and a storage device having stored thereon instructions, the instructions, when executed by the one or more processors, cause the one or more processors to:

respond to an automated or autonomous trigger by at least (i) training an initial predictive appointment model in accordance with an artificial intelligence technique using extracted features from a training dataset being a first portion of data from a dataset and (ii) testing the trained predictive appointment model based on a validation dataset being a second portion of data from the dataset to generate a tested predictive appointment model;

apply the tested predictive appointment model to data accessed from a database to generate customer appointment preference probabilities, wherein the generated customer appointment preference probabilities are maintained in local storage;

generate prediction values for the customers in the system;

apply the prediction values to determine a contact list for a plurality of customers most likely to fill an available appointment based on the customer appointment preference probabilities; and contact the plurality of customers offering the available appointment by at least automatically generating and transmitting electronic messages over a network to at least a computing device associated with each of the plurality of customers offering the available appointment and assigning the available appointment to a first customer of the plurality of customers accepting the appointment by returning a response electronic message over the network to one of the electronic messages within a prescribed time window.

11. The system of claim 10, wherein the electronic messages include a text message transmitted over the network.

12. The system of claim 11, wherein the artificial intelligence technique includes a machine learning technique, the artificial intelligence technique or the machine learning technique includes Random Forest, Logistic Regression, Naive Bayes (Multinomial), k-Nearest Neighbors, Deep Neural Networks, "Beta-geometric/NBD" (BG/NBD), and Support Vector Machines.

13. The system of claim 10, wherein the data in the database includes at least one of customer information, customer scheduling data, predicted customer preferences, or previously tested models.

14. The system of claim 10, wherein responsive to one of the plurality of customers accepting the appointment, generating and transmitting electronic messages to a second plurality of customers different than the plurality of customers of one or more alternative available appointments, the second plurality of customers assigning a priority to a remainder of the plurality of customers being part of the second plurality of customers.

15. The system of claim 10, wherein responsive to a customer of the plurality of customers accepting the available appointment after expiration of the prescribed time window after the available appointment has been assigned to the first customer, the appointment scheduling logic generating one or more alternate available appointments for selection by the customer, the one or more alternative available appointments being selected based on the predictive values associated with the customer.

16. The system of claim 10, wherein generating prediction values includes generating prediction values for at least one of day, time and period.

17. The system of claim 10, wherein the electronic messages include audio signaling associated with a telephone call transmitted over a telecommunication network.

18. The system of claim 10, wherein the tested predictive appointment model includes weightings and coefficients associated with the extracted features, the weightings and coefficients are developed during the testing of the trained predictive appointment model.

19. A method for establishing a predictive appointment scheduler system, the method comprising:

responsive to an automated or autonomous trigger, training an initial predictive appointment model operating in accordance with a machine learning technique based on extracted features from a training dataset and testing the trained predictive appointment model based on a validation dataset to generate a tested predictive appointment model;

applying the tested predictive appointment model to a dataset to generate customer appointment preference probabilities, wherein the generated customer appointment preference probabilities are maintained in a local storage;

aggregating a list of available appointments;

generating a contact list for a plurality of customers most likely to accept one of the appointments from the list of available appointments based on the customer appointment preference probabilities; and automatically generating and transmitting electronic messages over a network to at least a computing device associated with each of the plurality of customers offering one or more available appointments and assigning an appointment of the one or more available appointments to a first customer of the plurality of customers accepting the appointment by returning a response electronic message over the network to one of the electronic messages within a prescribed time window.

20. The method of claim 19, wherein the automated trigger includes any of (i) an addition of a new customer, (ii) an addition of a new appointment, (iii) a provision of a new appointment slot, or (iv) a modification of an existing appointment.

21. The method of claim 19, wherein a proportion of data associated with the training dataset to data associated with the validation dataset is a ratio of 80%:20%.

22. The method of claim 19, wherein the trained predictive model is generated using the machine learning technique or any autonomous technique, including at least one of Random Forest, Logistic Regression, Naive Bayes (Multinomial), k-Nearest Neighbors, Deep Neural Networks, "Beta-geometric/NBD" (BG/NBD), and Support Vector Machines techniques.

23. The method of claim 19, wherein the autonomous trigger includes any one of (i) a prescribed decrease in accuracy of a current predictive appointment model in use or (ii) a prescribed determination of inefficiencies in the scheduling of the list of available appointments.

24. The method of claim 19, wherein responsive to a customer of the plurality of customers accepting the appointment after expiration of the prescribed time window after the appointment has been assigned to the first customer, the method further comprising:

generating, by appointment scheduling logic, one or more alternate available appointments for selection by the customer, the one or more alternative available appointments being selected customer appointment preference probabilities associated with the customer.

25. The method of claim 19, wherein the generating and transmitting of the electronic messages over the network comprises generating and transmitting audio signaling associated with a telephone call transmitted over a telecommunication network.

26. The method of claim 19, wherein the generating and transmitting of the electronic messages over the network comprises generating and transmitting a text message transmitted over the network.

27. The method of claim 19, wherein the local storage corresponds to one or more databases.

28. The method of claim 19, wherein the tested predictive appointment model includes weightings and coefficients associated with the extracted features, the weightings and coefficients are developed during the testing of the trained predictive appointment model.

* * * * *